US008900764B2

(12) United States Patent
Tsuchiya et al.

(10) Patent No.: US 8,900,764 B2
(45) Date of Patent: *Dec. 2, 2014

(54) SOLID OXIDE FUEL CELL DEVICE

(75) Inventors: Katsuhisa Tsuchiya, Kitakyushu (JP);
Toshiharu Otsuka, Kitakyushu (JP);
Tsukasa Shigezumi, Kitakyushu (JP);
Toshiharu Ooe, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 139 days.

This patent is subject to a terminal disclaimer.

(21) Appl. No.: 12/788,904

(22) Filed: May 27, 2010

(65) Prior Publication Data

US 2010/0304244 A1 Dec. 2, 2010

(30) Foreign Application Priority Data

May 28, 2009 (JP) ................................. 2009-129052
May 19, 2010 (JP) ................................. 2010-114969

(51) Int. Cl.
*H01M 8/06* (2006.01)
*H01M 8/04* (2006.01)
*H01M 8/24* (2006.01)
*H01M 8/12* (2006.01)

(52) U.S. Cl.
CPC ........ *H01M 8/0618* (2013.01); *H01M 8/04268* (2013.01); *H01M 8/0432* (2013.01); *H01M 8/04365* (2013.01); *H01M 8/04373* (2013.01); *H01M 8/0438* (2013.01); *H01M 8/04395* (2013.01); *H01M 8/04425* (2013.01); *H01M 8/04619* (2013.01); *H01M 8/04753* (2013.01); *H01M 8/04776* (2013.01); *H01M 8/04992* (2013.01); *H01M 8/243* (2013.01); *H01M 8/04022* (2013.01); *H01M 8/04492* (2013.01); *H01M 8/04567* (2013.01); *H01M 8/04597* (2013.01); *H01M 2008/1293* (2013.01); *Y02E 60/50* (2013.01); *Y02E 60/525* (2013.01)
USPC ............ 429/423; 429/408; 429/428; 429/429

(58) Field of Classification Search
None
See application file for complete search history.

(56) References Cited

U.S. PATENT DOCUMENTS

2004/0005489 A1* 1/2004 Wakabayashi et al. ......... 429/24
2005/0106429 A1* 5/2005 Keefer ............................ 429/20

(Continued)

FOREIGN PATENT DOCUMENTS

| JP | 2007-103194 A | 4/2007 |
| JP | 2009-032555 A | 2/2009 |
| WO | WO 2005/050768 A1 | 6/2005 |
| WO | WO 2005/119824 A2 | 12/2005 |

OTHER PUBLICATIONS

Extended European Search Report for European Application No. 10164041.5, dated Sep. 8, 2010, 7 pages.

*Primary Examiner* — Barbara Gilliam
*Assistant Examiner* — Adam A Arciero
(74) *Attorney, Agent, or Firm* — Brinks Gilson & Lione

(57) ABSTRACT

To provide a solid oxide fuel cell device capable of smooth transition from a startup state to an electrical generating state. The present invention is a solid oxide fuel cell device (1) for generating electricity, having a fuel cell module (2); a reformer (20), a fuel supply device (38); a water supply device (28), a generating oxidant gas supply device (45), and a controller (110) for controlling the fuel supply device and water supply device at the time of startup when the fuel cell module solid oxide fuel cell unit is raised to a temperature at which electrical generation is possible, inducing in the reformer a SR in which only a steam reforming reaction occurs; wherein the control section maintains the fuel supply flow rate in the SR immediately prior to electrical generation at an electrical generation standby fuel supply flow rate determined according to solid oxide fuel module usage conditions and smaller than the fuel supply flow rate at the time of SR startup.

10 Claims, 13 Drawing Sheets

(56) References Cited

U.S. PATENT DOCUMENTS

| | | | |
|---|---|---|---|
| 2010/0248048 A1* | 9/2010 | Ooe et al. | 429/423 |
| 2010/0304242 A1* | 12/2010 | Tsuchiya et al. | 429/423 |
| 2010/0304245 A1* | 12/2010 | Tsuchiya et al. | 429/423 |
| 2010/0304246 A1* | 12/2010 | Watanabe et al. | 429/423 |
| 2010/0304249 A1* | 12/2010 | Tsuchiya et al. | 429/429 |

* cited by examiner

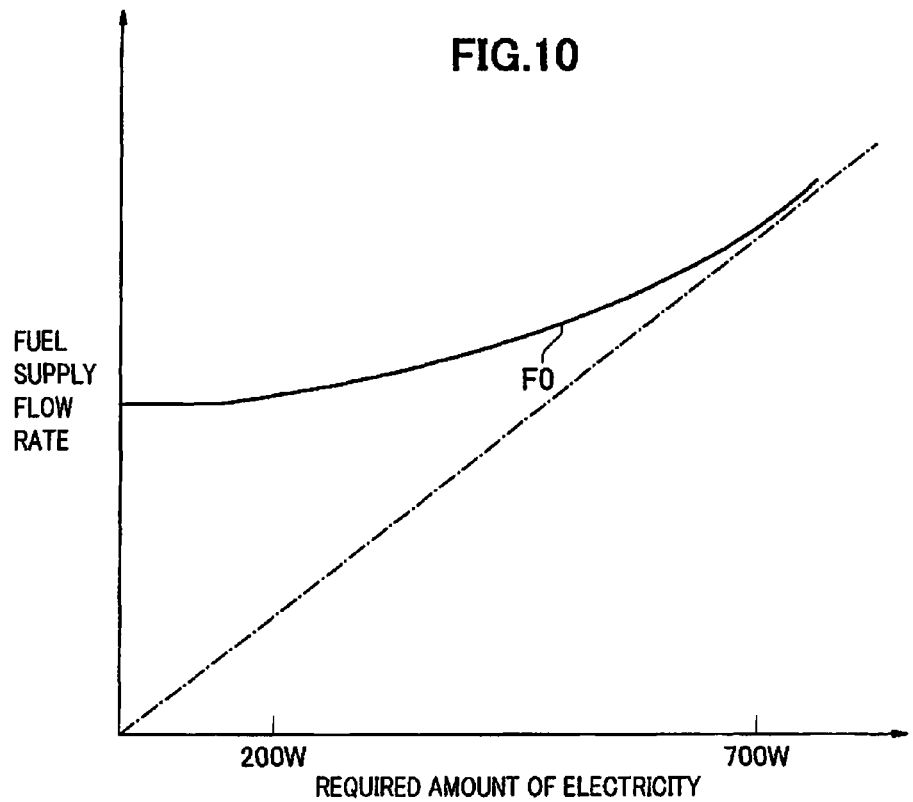
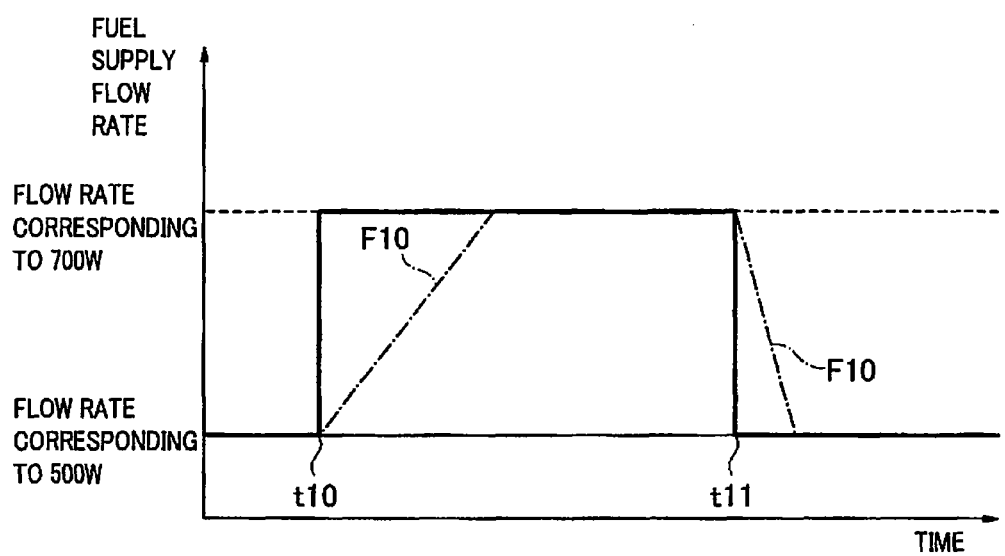

FIG.12

| REQUIRED AMOUNT OF ELECTRICITY | FUEL SUPPLY FLOW RATE L/min | GENERATING AIR SUPPLY FLOW RATE L/min | WATER FLOW RATE cc/min | FUEL UTILIZATION RATIO % | AIR UTILIZATION RATIO % |
|---|---|---|---|---|---|
| 700W | 2.8 | 60 | 6.0 | 68 | 35 |
| 600W | 2.6 | 50 | 5.8 | 62 | 35 |
| 500W | 2.3 | 42 | 5.5 | 58 | 34 |
| 400W | 1.9 | 35 | 4.5 | 55 | 34 |
| 300W | 1.7 | 30 | 4.0 | 47 | 29 |
| 200W | 1.5 | 26 | 3.5 | 35 | 22 |

FIG.13

| MODE | STATE | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION (°C) | | |
|---|---|---|---|---|---|---|---|---|
| | | | | | | REFORMER | STACK | EVAPORATING SECTION |
| STARTUP MODE | COMBUSTION OPERATION | 6.0 | 10.0 | 100.0 | 0.0 | 300°C OR ABOVE | – | – |
| | POX1 | 6.0 | 10.0 | 100.0 | 0.0 | 350°C OR ABOVE | – | – |
| | POX2 | 5.0 | 18.0 | 100.0 | 0.0 | 600°C OR ABOVE | 250°C OR ABOVE | – |
| | ATR1 | 5.0 | 8.0 | 100.0 | 2.0 | 600°C OR ABOVE | 400°C OR ABOVE | 100°C OR ABOVE |
| | ATR2 | 4.0 | 4.0 | 100.0 | 3.0 | 650°C OR ABOVE | 600°C OR ABOVE | 100°C OR ABOVE |
| | SR1 | 3.0 | 0.0 | 100.0 | 8.0 | 650°C OR ABOVE | 700°C OR ABOVE | 100°C OR ABOVE |
| | SR2 | * | 0.0 | * | * | 650°C OR ABOVE | 700°C OR ABOVE | 100°C OR ABOVE |

* DETERMINED CORRESPONDING TO ESTIMATED VALUE OF REQUIRED POWER

SOLID OXIDE FUEL CELL DEVICE

RELATED APPLICATIONS

This application claims priority under 35 U.S.C. §119 to Japanese Patent Application Nos. 2009-129052 filed on May 28, 2009, and 2010-114969 filed on May 19, 2010, the entire contents of which are hereby incorporated by reference.

BACKGROUND OF THE INVENTION

1. Field of the Invention

The present invention relates to a solid oxide fuel cell device, and more particularly to a solid oxide fuel cell device for generating electricity in an amount proportional to required power, by reacting fuel with a generating oxidant gas.

2. Description of the Related Art

Solid oxide fuel cells ("SOFCs" below) operate at relatively high temperatures, using an oxide ion-conducting solid electrolyte as an electrolyte, with electrodes placed on each side thereof, and with fuel gas supplied to one side thereof and oxidant (air, oxygen, or the like) supplied to the other side thereof.

In such SOFCs, steam or carbon dioxide is produced by the reaction between oxygen ions passed through the oxide ion-conducting solid electrolyte and fuel, thereby generating electrical and thermal energy. The electrical energy is removed to outside the SOFC, where it is used for various electrical purposes. The thermal energy is transferred to the fuel, the SOFC, the oxidant, and the like, and is used to raise the temperature thereof.

Japanese Patent Unexamined Publication No. 2007-103194 (JP2007-103194A) sets forth a power supply furnished with a solid oxide fuel cell. In the fuel cell device set forth therein, fuel and air are combusted in a combustion chamber after contributing to the generation of electricity, and that heat of combustion is used to heat the cell stack.

Japanese Patent Unexamined Publication No. 2009-32555 (JP2009-32555A) sets forth a fuel cell device. In this fuel cell device, a fuel gas supplying reformer and fuel cell units are raised to a predetermined temperature in a startup stage. In this startup stage, switching off between a partial oxidation reforming process (POX), an auto-thermal process (ATR), and a steam reforming process (SR) occurs as the temperature rises within the reformer, thereby reforming the fuel.

Furthermore, in the fuel cell device set forth in JP2009-32555A, control is executed so that electrical generation by the cell stack is begun when the cell stack temperature reaches a temperature at which electrical generation can be started, and electricity is generated while a predetermined flow quantity of fuel gas supplied to the reformer and oxygen-containing gas supplied to the cell stack continue to be supplied during an interval between surpassing the temperature at which electrical generation can start and the elapse of a predetermined time. Sufficient electricity is thus obtained when the load-following operation is started following the end of the continuous supply of a predetermined flow quantity.

SUMMARY OF THE INVENTION

However, even in solid oxide fuel cell units which perform startup in the way described in JP2009-32555A, the problem occurs that when a load-following operation is begun after generating electricity by continuously supplying a predetermined flow quantity of fuel and oxidant gas, operation of the solid oxide fuel cell device becomes unstable. For example, when the required power at the time of startup is small, the quantity of fuel supplied suddenly drops when the load-following operation begins. For this reason, the quantity of fuel combusted to heat the reformer declines, and, because the steam reforming reaction taking place inside the reformer is an endothermic reaction, the temperatures of the reformer and the cell stack may suddenly drop, making it difficult to generate electricity in a normal manner. In particular, when the cell stack temperature drops upon startup of electrical generation, a long period of time is required to restore this to a temperature at which electricity can be generated, leading to the problem that normal electrical generation cannot be performed over a long time period.

The present invention therefore has the object of providing a solid oxide fuel cell device capable of smoothly transitioning from a startup state to an electrical generating state.

In order to resolve the above-described problems, the present invention is a solid oxide fuel cell device for reacting fuel with an electrical generating oxidant gas to generate electrical power in an amount corresponding to a required power, comprising: a fuel cell module furnished with multiple solid oxide fuel cell units; a reformer for supplying reformed fuel to the solid oxide fuel cell units; a fuel supply device for supplying fuel to be reformed to the reformer; a water supply device for supplying water to the reformer; a generating oxidant gas supply device for supplying generating oxidant gas to the solid oxide fuel cell units; and a controller for controlling the fuel supply device and the water supply device during startup procedure wherein the solid oxide fuel cell units of the fuel cell module are raised to a temperature at which electricity can be generated, carrying out within the reformer a SR in which only the steam reforming reaction occurs, then starting electrical generation; whereby the controller controls the fuel supply device so that the fuel supply flow rate in the SR immediately prior to electrical generation is maintained at an electrical generation standby fuel supply flow rate which is determined according to the fuel cell module usage conditions, and is less than the fuel supply flow rate at the time of SR startup.

In the present invention thus constituted, the controller controls the fuel supply device, the water supply device, and the generating oxidant gas supply device, supplying fuel and water to the reformer, and supplying generating oxidant gas to the solid oxide fuel cell units. In the startup procedure, the solid oxide fuel cell units are raised to a temperature at which electricity can be generated, the controller induces in the reformer an SR operation, in which only the steam reforming reaction takes place. Here, the controller controls the fuel supply device so that the fuel supply flow rate in the SR immediately prior to electrical generation is maintained at an electrical generation standby fuel supply flow rate, determined according to the fuel cell module usage conditions at a level less than the fuel supply flow rate at the time of SR startup.

In the present invention thus constituted, the fuel supply flow rate in the SR immediately prior to electrical generation is maintained at the electrical generation standby fuel supply flow rate, therefore fuel combustion at the time of electrical generation startup is stabilized and thermal balance within the reformer is also stabilized. Accordingly, it is possible to smoothly transit from the startup procedure to electrical generation state. Further, the fuel supply flow rate in the SR immediately prior to electrical generation is less than the fuel supply flow rate at the time of SR startup, therefore a sudden drop in the temperature of the solid oxide fuel cell units can be prevented, even when the fuel supply flow rate at the time of electrical generation startup is reduced. The fuel supply flow rate at the time of electrical generation startup is set based on the fuel cell module usage conditions, therefore it is not necessary to change the fuel supply flow rate or it is not necessary to significantly change the fuel supply flow rate at the time of electrical generation startup, and a smooth transition to the electrical generating state can be achieved. Also, problem caused by airflow turbulence in the fuel cell module accompanying with the change of the fuel supply flow rate at the time of electrical generation startup can be suppressed.

The present invention preferably further comprises a power requirement estimating circuit for estimating required power at electrical generation startup, wherein the controller sets the electrical generation standby fuel supply flow rate based on the required power estimated by the power requirement estimating circuit.

In the present invention thus constituted, the required power estimating circuit estimates the required power at the time of electrical generation startup, and a flow rate of fuel determined based on the estimated required power is supplied, therefore by setting the electrical generation standby fuel supply flow rate to a fuel supply flow rate corresponding to the estimated required power, it becomes unnecessary to change the fuel supply flow rate at the time of electrical generation startup, assuming the required power at electrical generation startup has been accurately estimated. Even if the estimated required power is not accurate, or the electrical generation standby fuel supply flow rate is set to a flow rate which differs from the fuel supply flow rate corresponding to the estimated required power, it is not necessary to significantly change the fuel supply flow rate at the time of electrical generation startup, and a smooth transition to the electrical generating state can be achieved.

In the present invention, the fuel cell module outputs variable electrical power in a predetermined output power range, and the controller preferably maintains as the electrical generation standby fuel supply flow rate a predetermined lower limit fuel supply flow rate greater than the fuel supply flow rate corresponding to the minimum output electrical power in the output power range.

In the present invention thus constituted, the electrical generation fuel supply flow rate has a value greater than the fuel supply flow rate corresponding to the minimum electrical power output in the electrical power output range, therefore excessive drops in the temperature of the solid oxide fuel cell unit and shortages of electrical power caused by insufficient fuel can be prevented, even when the power requirement increases during the interval when the electrical generation standby fuel supply flow rate is being maintained.

In the present invention the power requirement estimating circuit preferably estimates the required power at the time of electrical generation startup based on the required power up until the controller starts the fuel supply of the electrical generation standby fuel supply flow rate.

In the present invention thus constituted, the electrical generation standby fuel supply flow rate is determined based on the required power up until the controller starts the fuel supply of such fuel supply flow rate, therefore the required power can be accurately estimated and smoothly transitioning to the electrical generating state.

In the present invention the power requirement estimating circuit preferably estimates required power at the time of electrical generation startup by averaging the required power up until the controller starts supply of the electrical generation standby fuel supply flow rate.

In the present invention thus constituted, the required power at the time of electrical generation startup is estimated by averaging the required power prior to starting the fuel supply using the electrical generation standby fuel supply flow rate, therefore the appropriate required power can be estimated even when there are severe fluctuations in the required power prior to starting supply using the electrical generation standby fuel supply flow rate.

In the present invention the controller preferably maintains an increased fuel supply flow rate corresponding to the estimated required power as the electrical generation standby fuel supply flow rate.

In the present invention thus constituted, the electrical generation standby fuel supply flow rate is determined by increasing the fuel supply flow rate according to the estimated power requirement, therefore excessive drops of the solid oxide fuel cell unit temperature and electrical power shortages caused by insufficient fuel can be prevented, even if the power requirement increases during the interval when the electrical generation standby fuel supply flow rate is being maintained.

In the present invention the controller preferably determines the electrical generation standby fuel supply flow rate based on the time of day when the fuel cell module is started, from among multiple times of day into which a day is divided.

In the present invention thus constituted, the power requirement is estimated based on the time of day when the solid oxide fuel module is started, therefore the power requirement can be easily estimated. Alternatively, a generally reasonable electrical power requirement can be estimated using this estimating method even when there are severe fluctuations in the power requirement and it is difficult to accurately estimate required power at the startup of electrical generation from past power requirements.

In the present invention the controller preferably controls the generating oxidant gas supply device so that the flow rate of generating oxidant gas supplied during the interval when the electrical generation standby fuel supply flow rate is being maintained will be maintained at a generating oxidant gas supply flow rate necessary for generating electricity using the electrical generation standby fuel supply flow rate.

In the present invention thus constituted, the supply flow rate of oxidant gas is maintained at a generating oxidant gas supply flow rate necessary for generating electricity by supplying the electrical generation standby fuel supply flow rate, therefore assuming the required power at the time of electrical generation startup is accurately estimated, a smooth transition to the electrical generating state can be achieved by setting the electrical generation standby fuel supply flow rate to a fuel supply flow rate corresponding to the estimated power requirement, without the need to change the fuel supply flow rate or the generating oxidant gas supply flow rate at the time of electrical generation startup.

In the present invention the controller preferably controls the fuel supply device, the water supply device, and the generating oxidant gas supply device so that the proportions of the fuel supply flow rate, water supply flow rate, and generating oxidant gas supply flow rate in the SR immediately prior to electrical generation are predetermined electrical generation standby supply proportions which differ from the proportions of fuel supply flow rate, water supply flow rate, and generating oxidant gas supply flow rate during electrical generation.

In general, the supply flow rate proportions at the time of electrical generation are set to predetermined proportions. In the present invention thus constituted, the predetermined supply flow rates for electrical generation standby proportions are set at proportions different from those of the supply flow rates during electrical generation, therefore a smooth transition to the electrical generation state can be achieved by setting the predetermined electrical generation standby supply flow rates to values optimized for electrical generation standby. Specifically, temperature reductions, airflow turbulence, and unstable fuel combustion in the fuel cell module can be prevented during the SR operation and at the time of electrical generation startup by appropriately setting predetermined electrical generation standby supply flow rates.

In the present invention, the electrical generation standby supply proportions are preferably set so that the proportion of the generating oxidant gas supply flow rate to the total of the fuel supply flow rate, water supply flow rate, and generating oxidant gas supply flow rate is greater than the proportion of the generating oxidant gas supply flow rate to the total of the fuel supply flow rate, water supply flow rate, and generating oxidant gas supply flow rate when generating electricity.

In the present invention thus constituted, the generating oxidant gas supply flow rate does not decline very much when the fuel supply flow rate is reduced in the SR operation prior to startup of electrical generation, therefore the range of change in the flow of gas flowing into the fuel cell module can be reduced and airflow turbulence can be made relatively small even when the fuel supply flow rate declines during the SR operation, so that drops in the solid oxide fuel cell unit temperature caused by airflow turbulence can be prevented.

The present invention is a solid oxide fuel cell device for reacting fuel with an electrical generating oxidant gas to generate electrical power in an amount corresponding to a required power, comprising: a fuel cell module furnished with multiple solid oxide fuel cell units; a reformer for supplying reformed fuel to the solid oxide fuel cell units; fuel supply means for supplying fuel to be reformed to the reformer; water supply means for supplying water to the reformer; generating oxidant gas supply means for supplying generating oxidant gas to the solid oxide fuel cell units; and control means for controlling the fuel supply means and the water supply means during startup procedure wherein the solid oxide fuel cell units of the fuel cell module are raised to a temperature at which electricity can be generated, carrying out within the reformer a SR in which only the steam reforming reaction occurs, then starting electrical generation; whereby the control means controls the fuel supply means so that the fuel supply flow rate in the SR immediately prior to electrical generation is maintained at an electrical generation standby fuel supply flow rate determined according to fuel cell module usage conditions, and is less than the fuel supply flow rate at the time of SR startup.

The solid oxide fuel cell device of the present invention enables a smooth transition from the startup state to the electrical generating state.

BRIEF DESCRIPTION OF THE DRAWINGS

FIG. 10: A graph showing an example of the relationship between the required amount of generated electricity input to the control section and the fuel supply flow rate needed to produce the required amount of generated electricity in an embodiment of the present invention.

FIG. 11: A graph showing an example of the change over time in fuel supply flow rate relative to changes in the required amount of generated electricity in an embodiment of the present invention.

FIG. 12: A data table showing an example of the relationship between the required amount of generated electricity and the fuel supply flow rate, generating air supply flow rate, and water supply flow rate and the like needed to produce the required amount of generated electricity.

FIG. 13: An operation table showing an example of a solid oxide fuel cell device startup procedure in an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
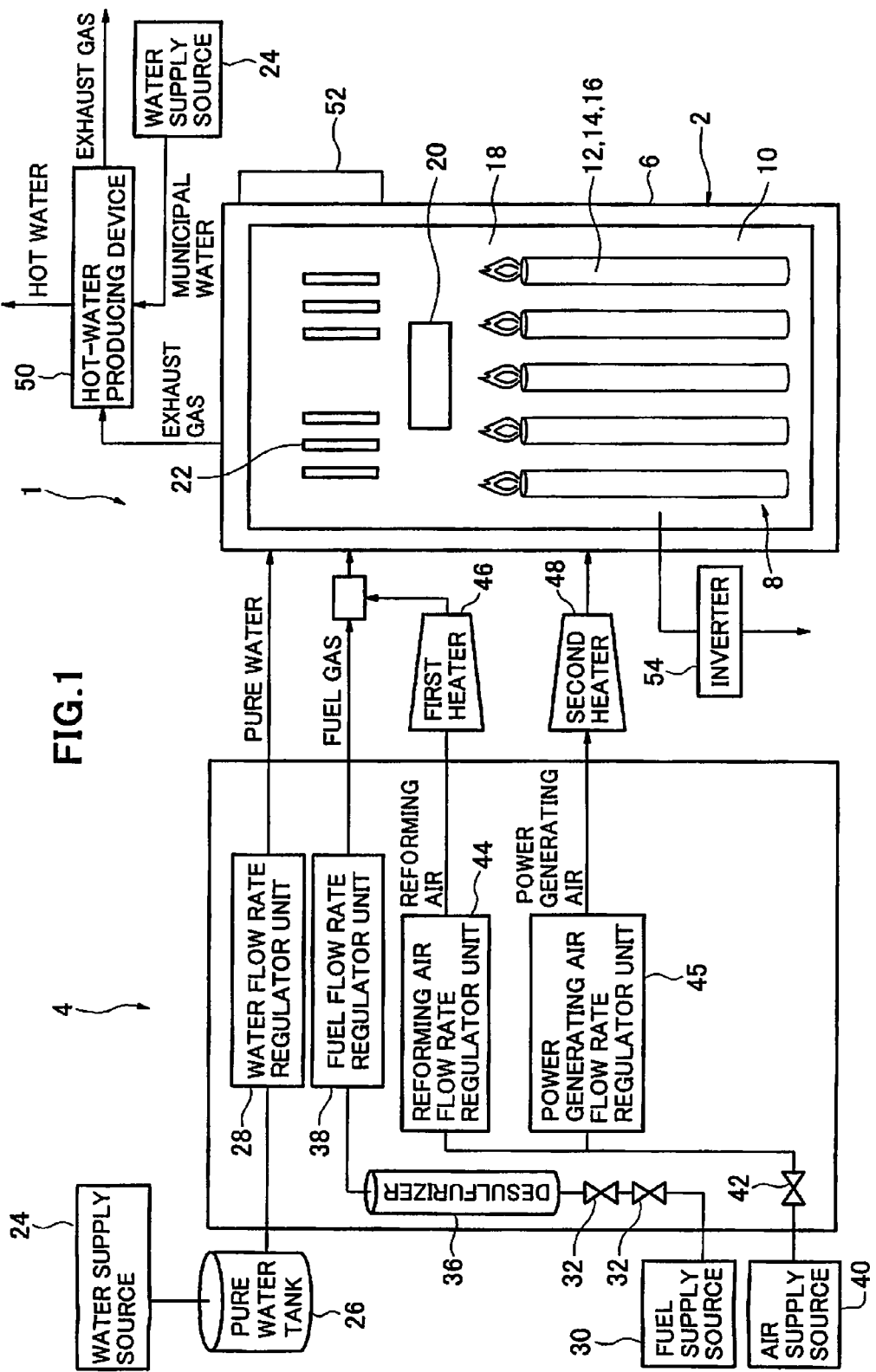
FIG. 1: An overview schematic showing a solid oxide fuel cell device (SOFC) according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
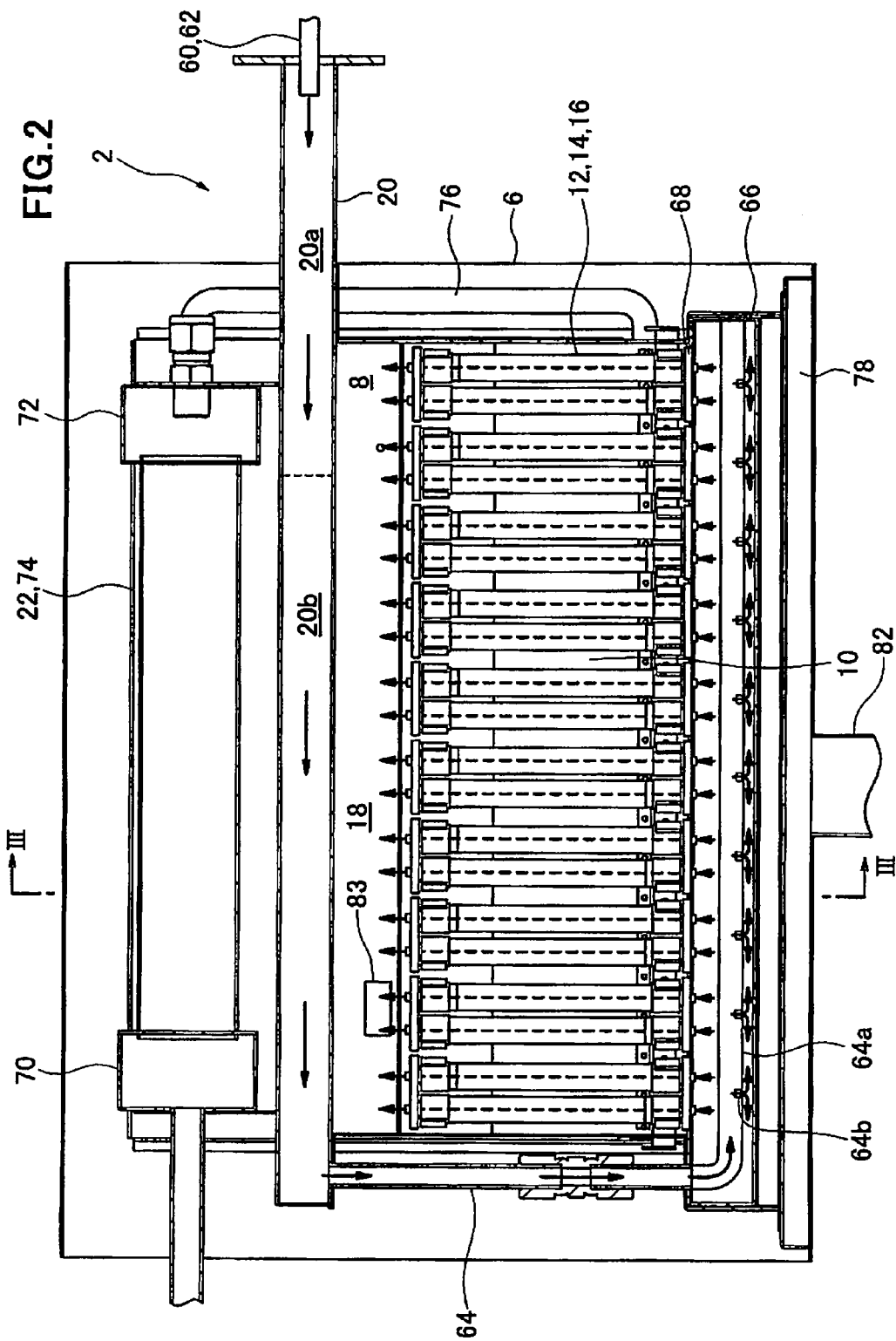
FIG. 2: A front elevation cross-section showing a solid oxide fuel cell device (SOFC) fuel cell module according to an embodiment of the present invention.
Figure 3:
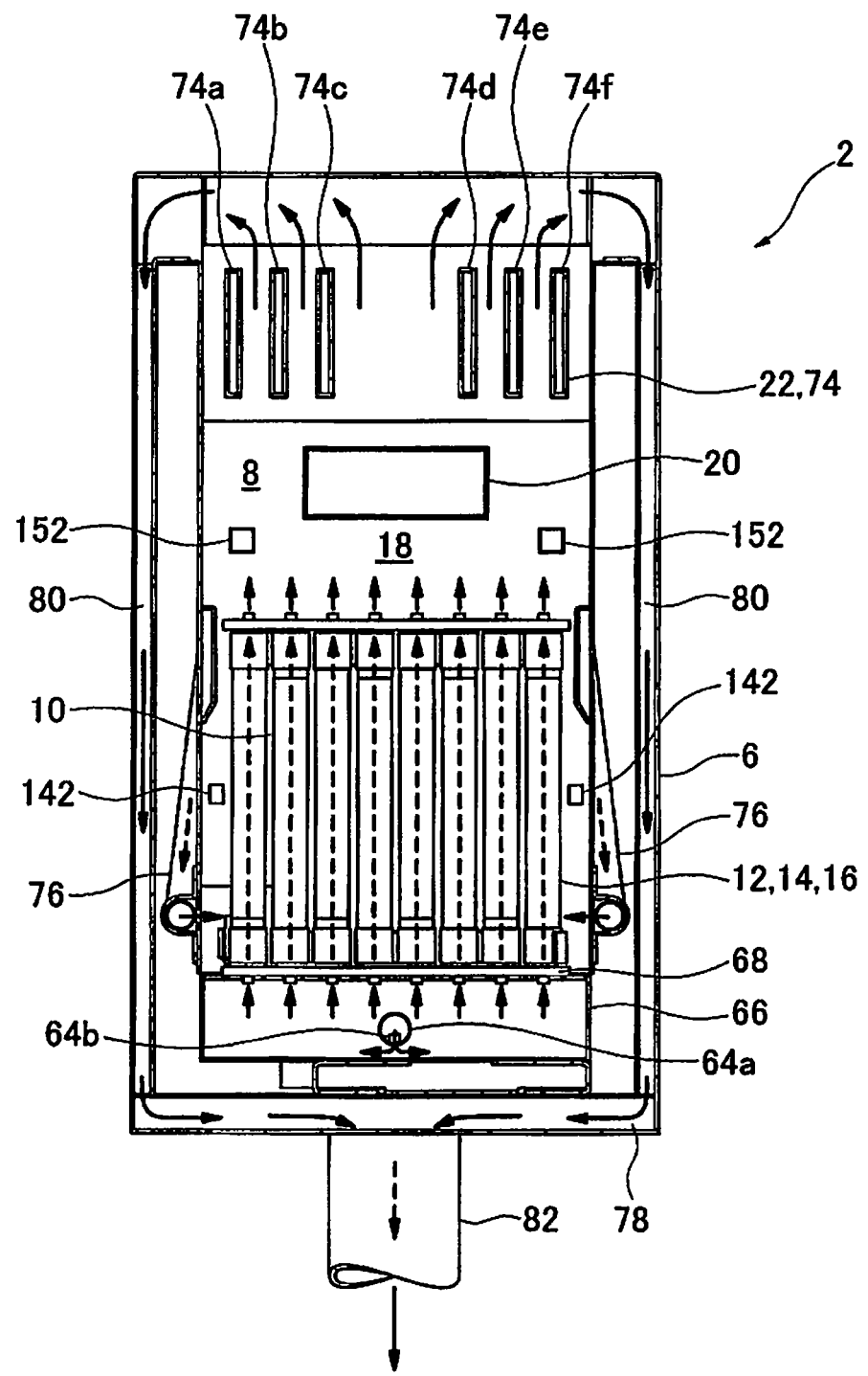
FIG. 3: A cross-section along line III-III in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
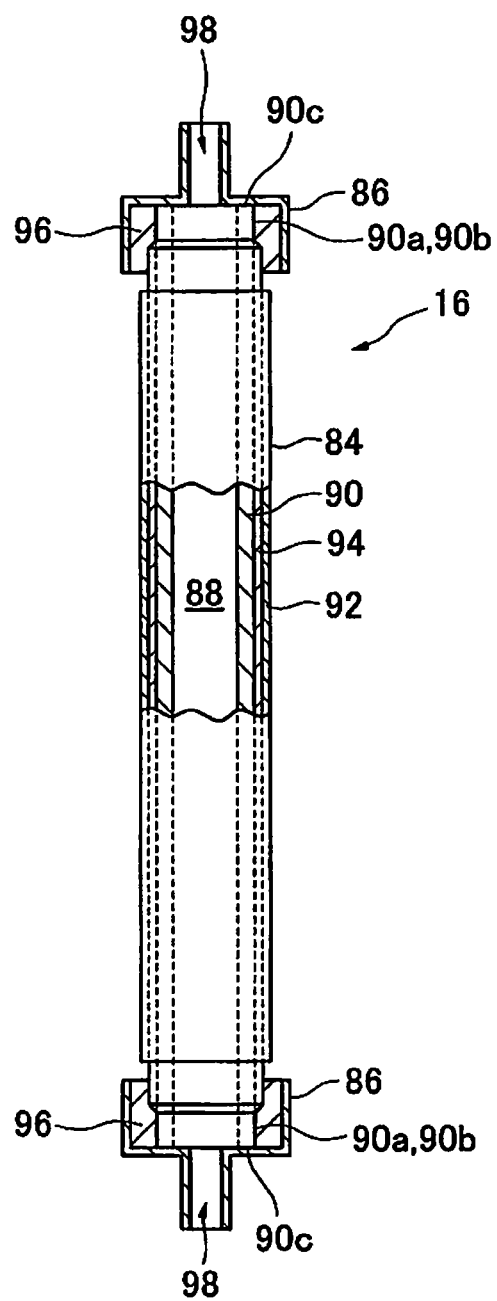
FIG. 4: A partial cross-section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
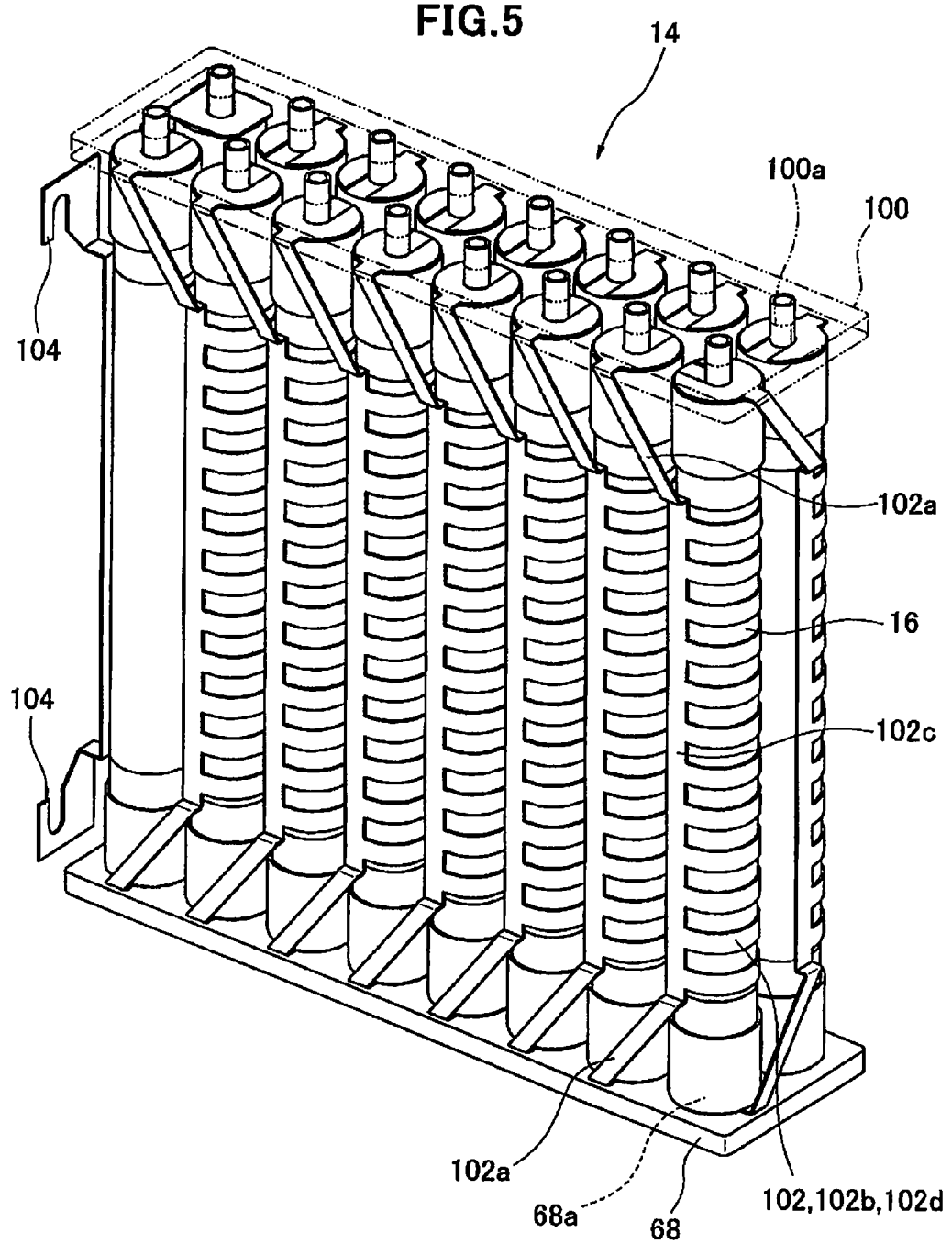
FIG. 5: A perspective diagram showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
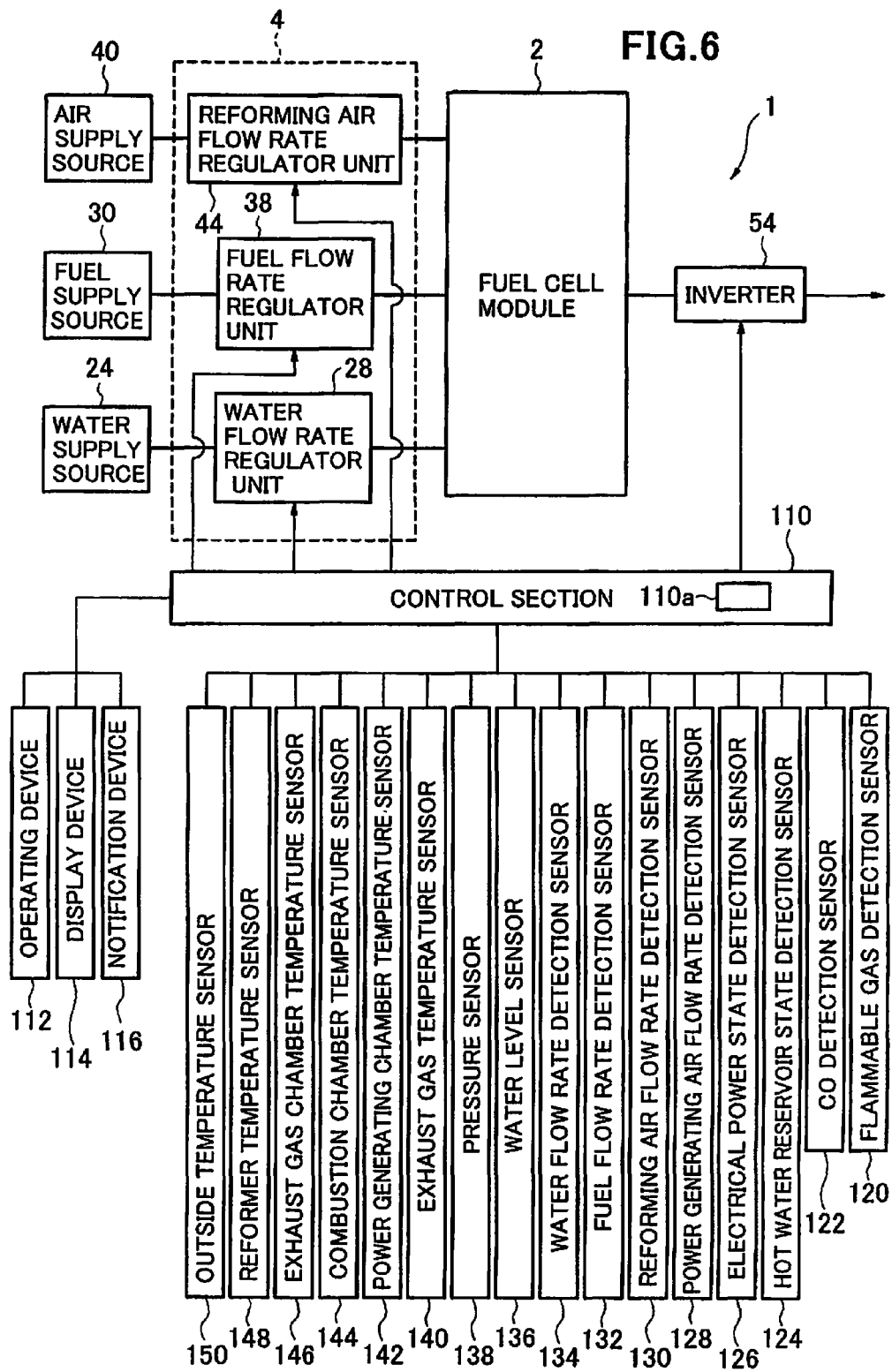
FIG. 6: A block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \qquad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

$$C_mH_n + xO_2 + yH_2O \rightarrow aCO_2 + bCO + cH_2 \qquad (2)$$

$$C_mH_n + xH_2O \rightarrow aCO_2 + bCO + cH_2 \qquad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
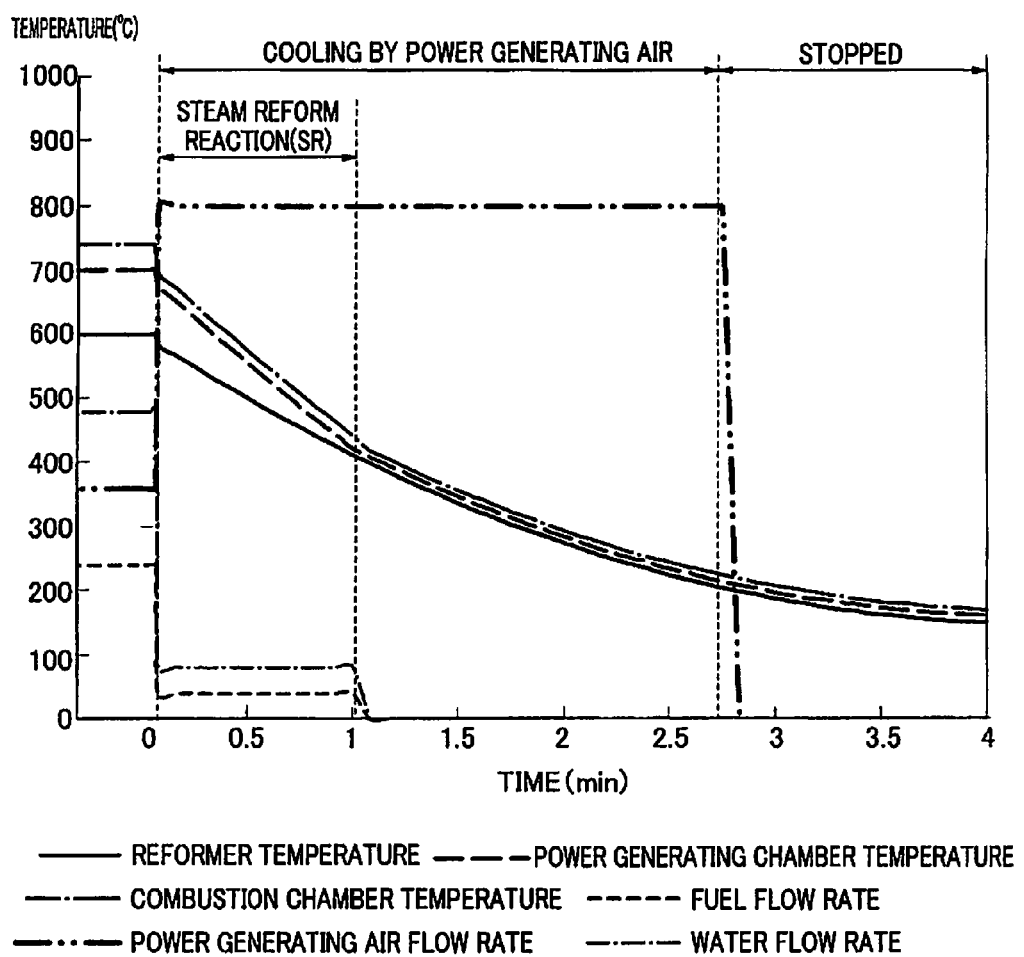
FIG. 8: A timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9 through 12, we discuss the effect of the load-following operation when generating electricity using a solid oxide fuel cell device 1 according to an embodiment of the present invention.

Figure 9:
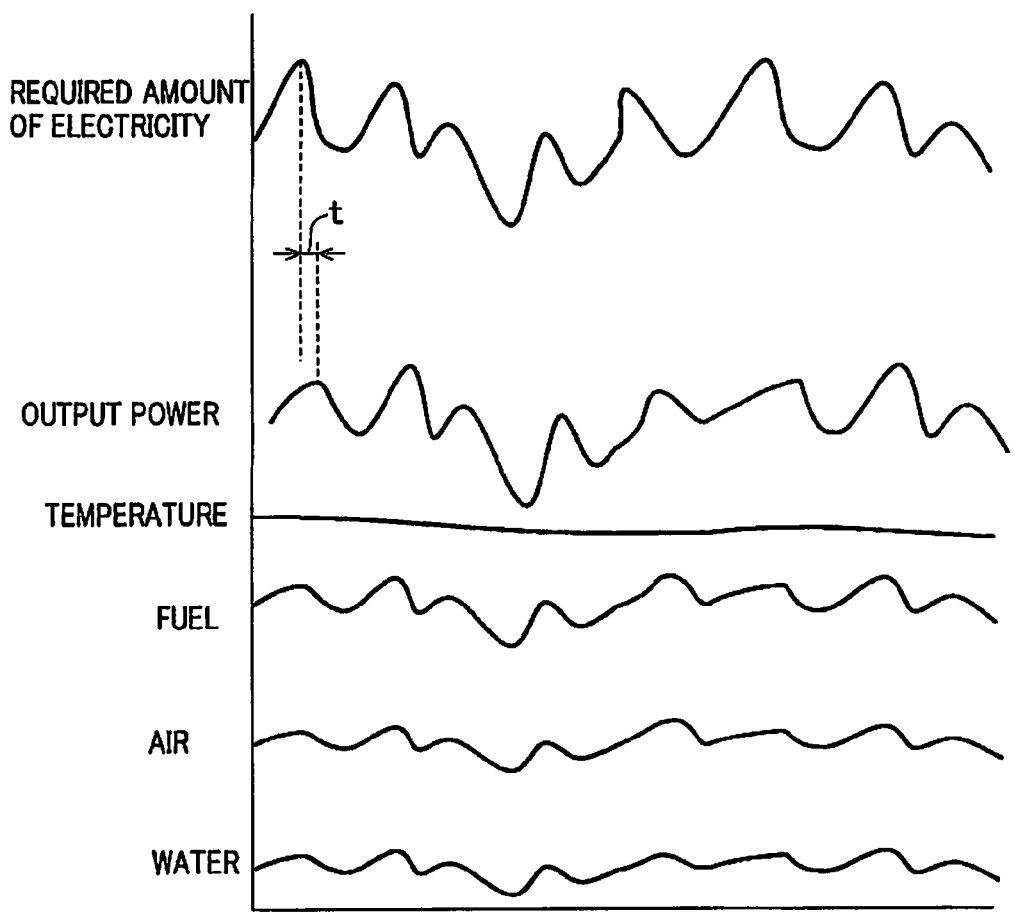
FIG. 9: A timing chart explaining the load-following operation in a solid oxide fuel cell device (SOFC) according to an embodiment of the present invention.

FIG. 9 is a timing chart explaining the load-following operation in a solid oxide fuel cell device of the embodiment. FIG. 10 is a graph showing an example of the relationship between the required amount of generated electricity input to the control section and the fuel supply flow rate needed to produce the required amount of generated electricity. FIG. 11 is a graph showing an example of the change over time in fuel supply flow rate relative to changes in the required amount of generated electricity. FIG. 12 is a data table showing an example of the relationship between the required amount of generated electricity and the fuel supply flow rate, generating air supply flow rate, and water supply flow rate and the like needed to produce the required amount of generated electricity.

Figure 7:
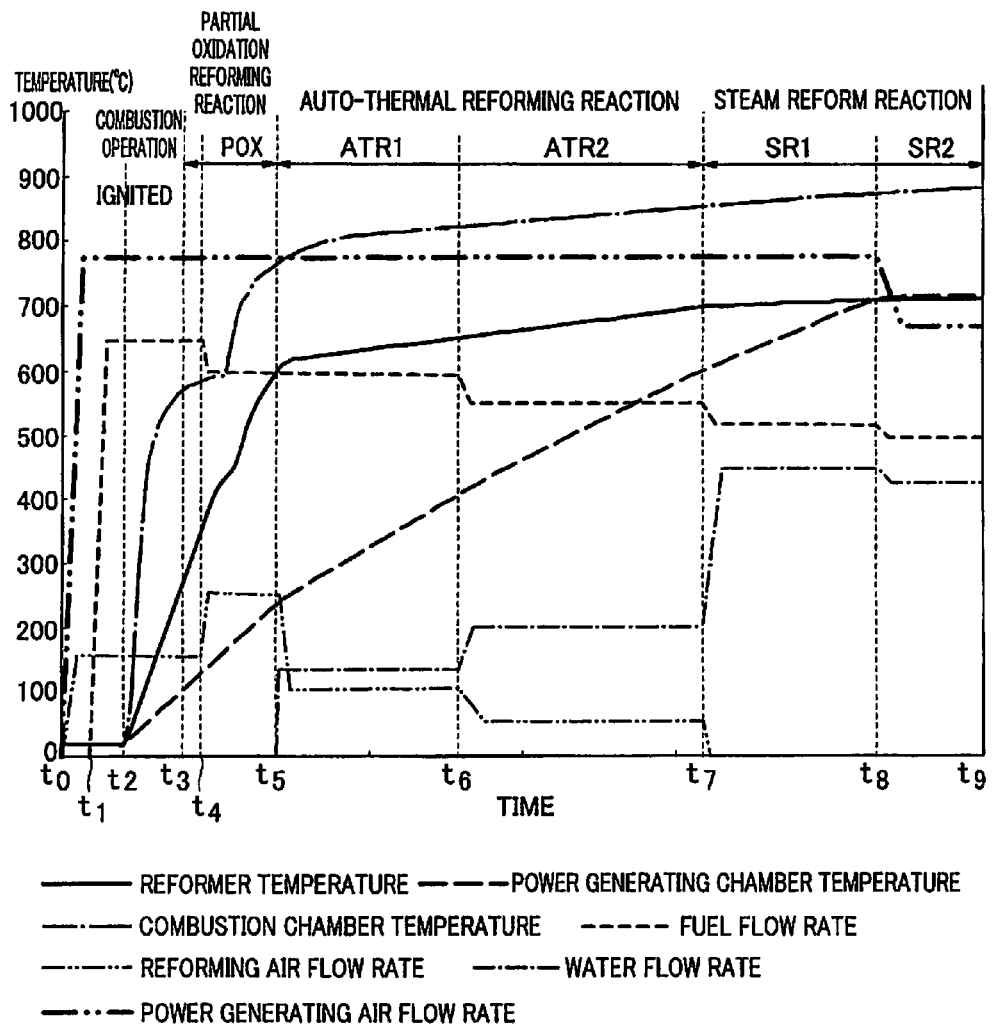
FIG. 7: A timing chart showing the operation upon startup of a solid oxide fuel cell device (SOFC) according to an embodiment of the present invention.

After the startup processing described in FIG. 7, the solid oxide fuel cell device 1 executes the load-following operation shown in FIG. 9 to obtain an output power corresponding to the required amount of generated electricity from the inverter 54 (FIG. 6). In other words, as shown in FIG. 6, the control section 110 serving as controller sends signals to the fuel flow regulator unit 38 serving as fuel supply device, the generating airflow regulator unit 45 serving as oxidant gas supply device, and the water flow regulator unit 28 serving as water supply device in response to the required amount of generated electricity from the inverter 54, thereby supplying the requisite flow rates of fuel, air, and water to the fuel cell module 2. As shown in FIG. 9, the output power of the solid oxide fuel cell device 1 thereby changes to follow the amount of generated electricity required from the inverter 54. Here, the output power response relative to the required amount of generated electricity is delayed; the delay in output power changes due to the slowing of the change in fuel supply flow rate, etc., and output power-following is also delayed relative to the sudden change in required electrical generation, due to the major suppression of change in fuel supply flow rate. Note that the control section 110, the fuel flow regulator unit 38, the generating airflow regulator unit 45, and the water flow regulator unit 28 function respectively as a control means, a fuel supply means, an oxidant gas supply means, and a water supply means.

The control section 110 determines the fuel supply flow rate in accordance with the required amount of generated electricity from the inverter 54 using the graph illustrating an example in FIG. 10, and controls the fuel flow regulator unit 38 so that the determined flow rate of fuel is supplied to the reformer 20 in the fuel cell module 2. The control section 110 determines a fuel supply flow rate relative to the required electrical generation according to curve F0 in FIG. 10. As shown in FIG. 10, the fuel supply flow rate is determined so as to increase monotonically with an increase in the required amount of generated electricity, however the fuel supply flow rate is essentially a fixed value at or below the required generated electricity amount of approximately 200 W.

When the required amount of generated electricity is changed, degradation of the fuel cell module 2 may occur due to the sudden change in fuel cell unit temperature if the fuel supply flow rate is suddenly changed, therefore as shown in FIG. 11, the fuel supply flow rate is gradually increased or gradually decreased in order to achieve smooth changes. As shown in FIG. 11, the rate of change in the fuel supply flow rate when fuel is increased is set to be smaller than the rate of change in the fuel supply flow rate when fuel is reduced. In other words, if the change is smoothened and the delay is made large relative to a reduction in the fuel supply flow rate, fuel is unnecessarily consumed, therefore the rate of change is set to be larger for a reduction than for an increase. FIG. 11 is a graph showing an example of the change in fuel supply flow rate over time when the required amount of generated electricity changes in a step fashion from 500 W to 700 W. As shown in FIG. 11, if the required amount of generated electricity is suddenly changed from 500 W to 700 W at time t10, the required fuel supply flow rate also suddenly changes, from a supply flow rate corresponding to a 500 W electrical power output to a supply flow rate corresponding to 700 W. However, the control section 110 controls the fuel flow regulator unit 38 to gradually increase the fuel supply flow rate as shown by the imaginary line F10 in FIG. 11, so as to prevent a sudden increase in the fuel supply flow rate.

Similarly, at time t11, when the required amount of generated electricity changes from 700 W to 500 W, the control section 110 gradually reduces the fuel supply flow rate following imaginary line F10 in FIG. 11 so as to avoid sudden reduction in the fuel supply flow rate. Note that the rate of change in the fuel supply flow rate is set to be more gradual for an increase in the supply flow rate than a reduction in the supply flow rate. As explained above, fuel reduction does not act in the direction of increasing the cell temperature, therefore optimization is performed to reduce wasteful fuel consumption while preventing excess temperature reduction caused by the reduction in fuel, taking note of the low sensitivity to cell degradation.

FIGS. 10 and 11 relate to fuel supply flow rate, but the generating air supply flow rate and water supply flow rate are similarly changed in response to the required amount of generated electricity. Also, as shown by the example in FIG. 12, the proportions of fuel, generating air, and water supply flow rates relative to the required amounts of generating electricity are optimized to obtain an appropriate operating state, and differ depending on the amount of generate electricity required. The solid oxide fuel cell device 1 in the present embodiment is constituted to output electrical power in an output power range of 200 W to 700 W. Moreover, FIG. 12 also shows the fuel utilization ratio, which is the proportion of fuel used for electrical generation relative to supplied fuel, and the air utilization ratio, which is the proportion of electrical generating air used for electrical generation relative to supplied electrical generating air. As shown in FIG. 12, the fuel utilization ratio and air utilization ratio are generally increasing as the required amount of electrical generation rises. Also, approximately all of fuel which has not been used for electrical generation is combusted in the combustion chamber 18, and used to heat the reformer 20.

Next, referring to FIGS. 13 and 14 and again to FIG. 7, we discuss details of startup processing for the solid oxide fuel cell device 1 of this embodiment of the present invention.

Figure 14:
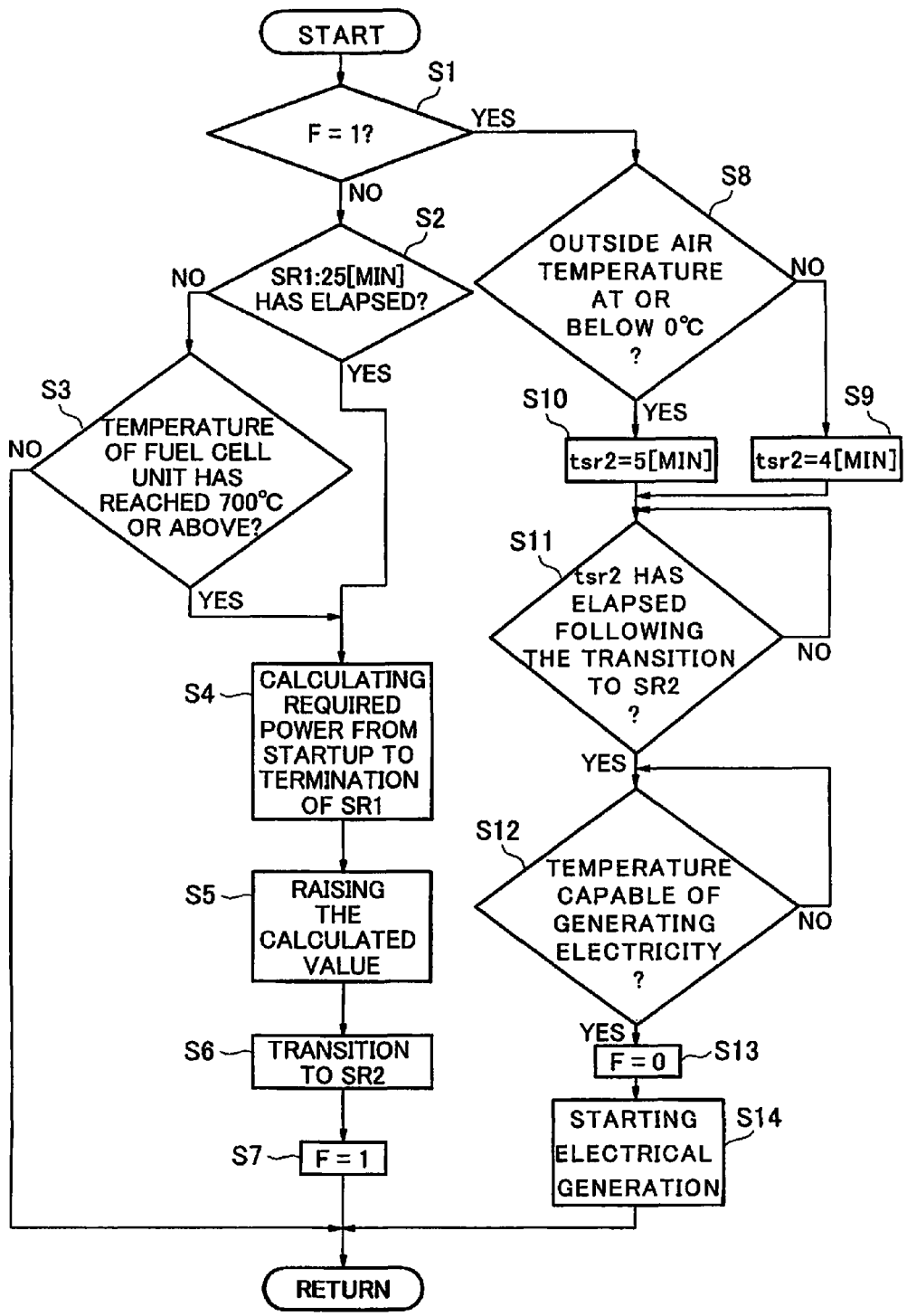
FIG. 14: A flowchart showing processing by the control section immediately prior to startup of electrical generation.

FIG. 13 is an operation table showing the solid oxide fuel cell device 1 startup processing procedure. FIG. 14 is a flow chart showing processing by the control section 110 from the start of SR until the start of electrical generation.

When the solid oxide fuel cell device 1 is started up at time t0 in FIG. 7, the control section 110 sends a signal to the reforming airflow regulator unit 44 serving as reforming oxidant gas supply device and to the generating airflow regulator unit 45 serving as generating oxidant gas supply device, thereby starting those devices and supplying reforming air and generating air to the fuel cell module 2. In the present embodiment, the reforming air supply flow rate is set at 10 L/min and the generating air supply flow rate at 100 L/min when supply is started at time t0.

Next, at time t1, the control section 110 sends a signal to the fuel flow regulator unit 38 serving as fuel supply device, thereby starting the supply of fuel to the reformer 20. Fuel and reforming air thereby fed into the reformer 20 are thus fed into each of the fuel cell units 16 via the reformer 20, the fuel gas supply pipe 64, and the manifold 66. Fuel and reforming air fed into each of the fuel cell units 16 flows out of the top ends of each of the fuel cell unit 16 fuel gas flow paths 98. Note that in the present embodiment, the fuel supply flow rate is set at 6 L/min when supply is started at time t1 (the "combustion operation" state in FIG. 13).

Moreover, at time t2, the control section 110 sends a signal to the ignition device 83 and ignites fuel flowing out of the fuel cell unit 16. Fuel is thus combusted in the combustion chamber 18, so that the reformer 20 disposed thereabove is heated, and the temperature of the combustion chamber 18, the electrical generation chamber 10 and the fuel cell stack 14 disposed within the chamber 10 also rises (times t2-t3 in FIG. 7). When the temperature of the reformer 20 reaches about 300° C. as a result of this heating of the reformer 20, a partial oxidation reform reaction (POX) occurs within the reformer 20 (time t3 in FIG. 7). Because the partial oxidation reform reaction is an exothermic reaction, the reformer 20 is heated by the heat of reaction arising from the occurrence of the partial oxidation reform reaction.

When the temperature further rises and the temperature of the reformer 20 reaches 350° C., the control section 110 sends a signal to the fuel flow regulator unit 38 reducing the fuel supply flow rate, and sends a signal to the reforming airflow regulator unit 44 increasing the reforming air supply flow rate (time t4 in FIG. 7). As a result, the fuel supply flow rate is changed to 5 L/min, and the reforming air supply flow rate is changed to 18 L/min (the "POX1" state in FIG. 13). These supply flow rates are appropriate supply flow rates for generating a partial oxidation reaction. In other words, in the initial temperature region in which a partial oxidation reaction begins to occur, a state is formed in which fuel is reliably ignited by increasing the proportion of fuel supplied, and ignition is stabilized by maintaining that supply flow rate (the "POX1" state in FIG. 13). Moreover, after stable ignition and a rise in temperature, fuel waste is suppressed by using a fuel supply flow rate sufficient to produce a partial oxidation reaction (the "POX2" state in FIG. 13).

Next, at time t5 in FIG. 7, when the reformer 20 temperature reaches 600° C. or above and the fuel cell unit 16 temperature reaches 250° C. or above, the control section 110 sends a signal to the reforming airflow regulator unit 44 to reduce the reforming air supply flow rate, and sends a signal to the water flow regulator unit 28 serving as water supply device to start the supply of water. This results in a change in the reforming air supply flow rate to 8 L/min, and in the water supply flow rate to 2 cc/min (the "ATR1" state in FIG. 13). A steam reforming reaction is also generated in the reformer 20 by introducing water (steam) into the reformer 20. In other words, in the FIG. 13 "ATR1" state, an auto-thermal reforming (ATR) occurs in which the partial oxidation reaction and the steam reforming reaction are combined.

In the present embodiment the temperature of the fuel cell unit 16 is measured by a generating chamber temperature sensor 142 serving as a temperature detection means disposed in the electrical generating chamber 10. The temperature inside the generating chamber and the temperature of the fuel cell units are not, precisely speaking, identical, but the temperature detected by the generating chamber temperature sensor reflects the temperature of the fuel cell unit, and the temperature of the fuel cell unit can be grasped by the temperature of the generating chamber temperature sensor inside the generating chamber. Note that in this Specification, "fuel cell unit temperature" means a temperature measured by any selected sensor indicating a value reflecting the temperature of the fuel cell unit.

Moreover, at time t6 in FIG. 7, when the temperature of the reformer 20 reaches 600° C. or above and the temperature of the fuel cell unit 16 reaches 400° C. or above, the control section 110 sends a signal to the fuel flow regulator unit 38 and reduces the fuel supply flow rate. The control section 110 also sends a signal to the reforming airflow regulator unit 44 reducing the reforming air supply flow rate, and sends a signal to the water flow regulator unit 28 increasing the water supply flow rate. By this means, the fuel supply flow rate is changed to 4 L/min, the reforming air supply flow rate is changed to 4 L/min, and the water supply flow rate is changed to 3 cc/min (the "ATR2" state in FIG. 13). Reducing the reforming air supply flow rate and increasing the water supply flow rate results in a reduction in the proportion of the partial oxidation reaction and an increase in the proportion of the steam reforming reaction in the reformer 20.

Next, at time t7 in FIG. 7, when the temperature of the reformer 20 reaches 650° C. or above and the temperature of the fuel cell unit 16 reaches 600° C. or above, the control section 110 sends a signal to the reforming airflow regulator unit 44, stopping the supply of reforming air. The control section 110 also sends a signal to the fuel flow regulator unit 38 reducing the fuel supply flow rate, and sends a signal to the water flow regulator unit 28, increasing the water supply flow rate. The flow rate of fuel supplied is thus changed to 3 L/min, and the flow rate of water supplied is changed to 8 cc/min (the "SR1" state in FIG. 13). Because the supply of reforming air is stopped, the partial oxidation reaction ceases to occur inside the reformer 20, and the SR, in which only the steam reforming reaction takes place, commences.

When the state transitions to the "SR1" state, the control section 110 executes the flow chart shown in FIG. 14 repeatedly at a predetermined time interval.

First, in step S1 of FIG. 14, the value of flag F is determined. Flag F indicates whether solid oxide fuel cell device 1 startup processing has transitioned to the "SR2" state (FIG. 13), and sets flag F=0 at the time of startup. As described below, the value of the flag F is changed to a 1 when the startup process transitions to the "SR2" state. At time t7 in FIG. 7, the transition to the "SR2" state has still not occurred, so the process advances to step S2.

In step S2 a judgment is made as to whether 25 minutes, which is the initial SR continuation time tsr1, has elapsed following transition to the "SR1" state; i.e., whether 25 minutes has elapsed since time t7 in FIG. 7. If 25 minutes has elapsed, the process advances to step S4; if 25 minutes has not elapsed, the process advances to step S3. At step S3, a judgment is made as to whether the temperature of the fuel cell unit 16 has reached 700° C. or above at which electrical generation is possible; if it has reached 700° C. or above at which electrical generation is possible, the process advances to step S4; if it has not reached 700° C. or above, the first iteration of processing the flowchart shown in FIG. 14 ends. This causes the "SR1" state to be continued.

When 25 minutes has elapsed after a transition to the "SR1" state, or when the FIG. 14 flowchart is executed after the fuel cell unit 16 temperature has reached 700° C. or above, the process transitions from step S2 or step S3 to step S4, and "SR2" is started. In the example shown in the FIG. 7 flowchart, there is a transition in processing from step S3 to step S4 when the fuel cell unit 16 temperature reaches 700° C. at time t8.

At step S4, an average power requirement value is calculated by the power requirement estimating circuit 110a embedded in the control section 110 for the period from the startup of the of solid oxide fuel cell device 1 up to the start of "SR2" (time t0-t8 in FIG. 7). Next, in step S5, the required power average value calculated in step S4 is raised, and the fuel supply flow rate, electrical generation air supply flow rate, and water supply flow rate corresponding to that raised electrical power is determined. For example, if the average value of the required power calculated in step S4 was 520 W (100 V, 5.2 A), the respective supply flow rates in "SR2" state corresponding to a raised electrical power of 600 W (100 V, 6.0 A) in the "SR2" state are set at a fuel supply flow rate of 2.6 L/min, an electrical generation air supply flow rate of 50 L/min, and a water supply flow rate of 5.8 cc/min (FIG. 12). Note that the power requirement estimating circuit functions as a require power estimating means.

By setting each of the "SR2" supply flow rates in this way, a smooth transition can be achieved from the "SR2" state to the electrical generating state. In other words, if electrical generation is started using an estimated required power, major drops in the fuel supply flow rate can be prevented from occurring at the point of transition from "SR2" to electrical generation, since the flow rate of fuel supplied in "SR2" is slightly greater than the fuel supply flow rate required to output the required output. Furthermore, because fuel is supplied in a flow rate slightly greater than the fuel supply flow rate corresponding to the estimated required power, the fuel cell module can be prevented from undergoing a major fuel shortage even if the required power increases while the "SR2" is being executed.

Next, in step S6 of FIG. 14, the control section 110 sends signals to the fuel flow regulator unit 38, the generating airflow regulator unit 44, and the water flow regulator unit 28, and starts supply of the flow rates of fuel, electrical generation air, and water determined in step 5. Also, in step S7 the value of the flag F is changed to a 1, indicating that the startup processing has transitioned to the "SR2" state, and the first iteration of the flowchart shown in FIG. 14 is ended.

Next, when the flowchart shown in FIG. 14 is executed after the transition to the "SR2" state, the value of the flag F is changed to a 1, so processing transitions from step S1 to step S8. In step S8, the control section 110 judges whether the temperature detected by the outside air temperature sensor 150 is at or below 0° C. If it is not at or below 0° C., the process advances to step S9; if it is at or below 0° C., the process advances to step S10. In step S9, the transition time to electrical generation tsr2, which is the time over which the "SR2" state is maintained, is set to 4 minutes. When the outside temperature is at 0° C. or below, the transition time to electrical generation tsr2 is set to 5 minutes in step S10.

Next, in step S11, a judgment is made as to whether the transition time to electrical generation tsr2 has elapsed following the transition to the "SR2" state. If the transition time to electrical generation tsr2 has elapsed, the system advances to step S12; if it has not elapsed, the processing in step S11 is repeated and the "SR2" state is maintained until the transition time to electrical generation tsr2 has elapsed. Furthermore, a judgment is made in step S12 as to whether the temperature of the fuel cell unit 16 has reached the temperature to enable electrical generation corresponding to the estimated required power. If the fuel cell unit 16 temperature is at or above the temperature at which electricity can be generated, the system advances to step S13; if it has not reached the temperature at which electricity can be generated, the step S12 processing is repeated until the temperature at which electricity can be generated is reached, and the "SR2" state is maintained.

In step S13 the value of the flag F is returned to 0; in step S14 the control section 110 starts electrical generation corresponding to the required power (t9 in FIG. 7). The fuel supply flow rate, generating air supply flow rate, and water supply flow rate after startup of electrical generation are determined and supplied according to required power based on FIGS. 10 and 11, and a load-following operation is executed.

In the solid oxide fuel cell device of the present embodiment of the invention, the fuel supply flow rate in "SR2" immediately prior to electrical generation is maintained at the electrical generation standby fuel supply flow rate, therefore fuel combustion at the time of startup of electrical generation can be stabilized, as can stabilize the reformer thermal balance. This enables a smooth transition from the startup state to the electrical generating state. Also, the fuel supply flow rate in the "SR2" immediately prior to electrical generation is reduced more than the fuel supply flow rate in "SR1," causing a reduction in the flow rate of fuel inducing an endothermic reaction in the reformer immediately prior to electrical generation. Moreover, the fuel supply flow rate immediately prior to electrical generation is determined in accordance with the required power estimated by the power requirement estimating circuit, therefore large changes in the fuel supply flow rate at the time of electrical generation startup can be prevented, a smoother transition to the electrical generating state can be achieved, and fuel waste can be suppressed.

In the solid oxide fuel cell device of the present embodiment, the electrical generation standby fuel supply flow rate is determined according to the power required immediately prior to the start of supply thereof, therefore required power can be accurately estimated, and a smooth transition from the "SR2" state to the electrical generating state can be achieved.

Furthermore, in the solid oxide fuel cell device of the present embodiment, the electrical generation standby fuel supply flow rate is determined by increasing the fuel supply flow rate according to the estimated required power, even when the power requirement increases during the interval when the electrical generation standby fuel supply flow rate is being maintained in the "SR2" state.

In the solid oxide fuel cell device of the present embodiment, electrical generation starts when the transition time to electrical generation has elapsed and the temperature of the fuel cell unit has risen to the temperature at which electricity can be generated, therefore startup of electrical generation in a state in which the fuel cell unit temperature has not sufficiently risen can be prevented, and even after the temperature has sufficiently risen, a fixed fuel supply flow rate is maintained until the transition time to electrical generation has elapsed, so that combustion of fuel in the combustion chamber can be stabilized.

In addition, in the solid oxide fuel cell device of the present embodiment, once the temperature of the solid oxide fuel cell unit has risen to the temperature at which electricity can be generated after the startup of the SR, the fuel supply flow rate is decreased, but if the predetermined initial SR continuation time has elapsed, the system transitions to the "SR2" state even if the temperature at which electricity can be generated has not been reached. In this case, the reduced fuel supply flow rate is maintained at least until the temperature of the fuel cell unit rises to the temperature at which electricity can be generated. Thus if the initial SR continuation time elapses even when the temperature at which electricity can be generated has not been reached, the reduced fuel supply flow rate "SR2" state is started, and the system waits to elapse the transition time to electrical generation and the temperature at which electricity can be generated to be reached in the "SR2" state, thereby enabling the time to be shortened following startup until electrical generation begins.

In the solid oxide fuel cell device of the present embodiment of the invention, reforming reactions in the reformer occur in the sequence POX, ATR, and SR, so the solid oxide fuel module operation can be prevented from becoming unstable at the time of startup, and a smoother startup can be achieved.

In the solid oxide fuel cell device of the present embodiment, the operating state at the time of electrical generation startup can be sufficiently stabilized by changing the transition time to electrical generation in accordance with predetermined environmental factors, even if the environment in which the fuel cell device is installed changes. In particular, when the outside temperature is low, combustion of fuel in the combustion chamber in the "SR2" state can be fully stabilized by extending the transition time to electrical generation, even if the outside temperature is low and the temperature of the solid oxide fuel cell unit has difficulty rising.

Note that while the transition time to electrical generation tsr2 was set based on the outside temperature in the embodiment described above, it is also acceptable for the transition time to electrical generation tsr2 to be changed according to environmental factors such as the outside temperature, water temperature, or time of day. In the example shown in FIG. 7, the fuel cell unit 16 temperature rapidly rises to the temperature at which electricity can be generated after the transition to the "SR1" state. However, as described above, when the predetermined initial SR continuation time tsr1 has elapsed after transition to the "SR1" state, the control section 110 causes the operation to transition to the "SR2" state even if the temperature at which electricity can be generated has not been reached. In other words, the control section 110 maintains the "SR1" state fuel supply flow rate until the fuel cell unit 16 rises to the temperature at which electricity can be generated, or until the initial SR continuation time tsr1 elapses. Furthermore, as described above, the control section 110 starts the electrical generation when the predetermined transition time to electrical generation tsr2 has elapsed and the fuel cell unit 16 temperature has risen to or above the temperature at which electricity can be generated following the transition to the "SR2" state. Therefore the "SR2" state is always continued for the transition time to electrical generation tsr2 or greater.

In the embodiment described above, fuel, generating air, and water corresponding to the electrical power determined by increasing the electrical power estimated by the power requirement estimating circuit are supplied in "SR2," but if the estimated required power is extremely small, the control section supplies more fuel, generating air, and water that the supply flow rates corresponding to the minimum electrical power which can be output by the solid oxide fuel module. In other words, in the present embodiment if the estimated required power is less than 200 W, a lower limit fuel supply flow rate corresponding to 300 W, which is greater than the 200 W minimum output electrical power in the output power range of 700 W to 200 W, will be supplied as the electrical generation standby fuel supply flow rate.

A lower limit fuel supply flow rate greater than the fuel supply flow rate corresponding to the minimum output electrical power in the output power range is thus used as the electrical generation standby fuel supply flow rate, therefore shortages of electrical power caused by insufficient fuel can be prevented, even when the power requirement increases during the interval when the electrical generation standby fuel supply flow rate is being maintained.

Furthermore, in the above-described embodiment the power requirement estimating circuit estimates the required power at time of electrical generation startup based on the average required power between startup and the start of "SR2," but a variation is also possible whereby the power requirement estimating circuit estimates required power based on the time of day when the solid oxide fuel cell device is started. As an example, the power requirement estimating circuit could be configured so that a day is divided into three times of day: day (6:00-16:00), night (16:00-24:00), and late night (0:00-6:00); if the time of "SR2" startup is day, the required power would be 400 W; if night, 700 W, and if late night, 200 W. In this variation, a generally reasonable electrical power can be estimated as the required power, even when severe fluctuations in required power make it difficult to estimate required power at the time of electrical generation startup from past required power.

In the above-described embodiment, the fuel, generating air, and water supplied in the "SR2" state are set at the supply flow rates corresponding to 400 W electrical generation, for example, when the increased estimated required power is 400 W, but as a variation electrical generation standby supply proportions optimized for "SR2" could also be adopted for the fuel supply flow rate, generating air supply flow rate, and water supply flow rate in the "SR2" state. For example, the respective supply flow rates in the "SR2" state could be determined so that the proportions of fuel and generating air combusted in the combustion chamber in the "SR2" state are equal to the proportions of fuel and generating air combusted in the combustion chamber at the time of electrical generation startup. Alternatively, the electrical generation standby supply proportion of the generating oxidant gas supply flow rate relative to the total of the fuel supply flow rate, water supply flow rate, and generating oxidant gas supply flow rate could be set to be greater than the proportion of the generating oxidant gas supply flow rate when generating electricity.

As shown in FIG. 12, for example, 2.8 L/min of fuel is supplied at an output electrical power of 700 W; at this point the fuel utilization ratio for electrical generation is 68%, therefore approximately 1.9 L/min of the 2.8 L/min fuel is being used, and the remaining approximately 0.90 L/min is used for combustion. 60 L/min of generating air is supplied at an output power of 700 W and the air utilization ratio is 35%, therefore approximately 21 L/min is being used for electrical generation, and approximately 39 L/min for combustion. Therefore the air-fuel ratio, which is the ratio of generating air to fuel when used for combustion at an electrical power output of 700 W, is 39/0.90=a multiple of approximately 43.5. In the "SR2" state all of the supplied fuel is used for combustion, therefore the fuel supply flow rate at the time of electrical generation startup and the fuel supply flow rate in the "SR2" state are set to be equal, and the generating air supply flow rate necessary for making the air-fuel ratio in the "SR2" state equal to the air-fuel ratio at time of electrical generation startup is the fuel supply flow rate of 2.8 L/min times the air-fuel ratio of 43.5, or approximately 122 L/min.

At an output electrical power of 400 W, on the other hand, the fuel supply flow rate is 1.9 L/min and the fuel utilization ratio is 55%, therefore approximately 1.0 L/min of fuel is used for electrical generation and approximately 0.85 L/min of fuel is used for combustion. At an output electrical power of 400 W, 35 L/min of generating are supplied, and the air utilization ratio is 34%, therefore approximately 12 L/min of generating air is used for electrical generation, and approximately 23 L/min is used for combustion. Therefore the air-fuel ratio at an output electrical power of 400 W is 23/0.85=a multiple of approximately 27.0. The flow rate of generating air necessary to make the air-fuel ratio in the "SR2" state equal that at the time of startup is therefore the fuel supply flow rate of 1.9 L/min times the air fuel ratio of 27.0, or approximately 51.3 L/min.

By thus setting the generating air supply flow rate, the flow rate of generating air supplied during the interval when the electrical generation standby fuel supply flow rate is maintained can be set to be approximately the same as the ratio of fuel and generating air combusted in the combustion chamber during electrical generation startup. In other words, equalizing the air-fuel ratio in the "SR2" state and the air-fuel ratio during electrical generation startup requires that the generating air for 700 W in the "SR2" state be approximately twice the flow rate supplied during electrical generation startup; doing the same at 400 W requires approximately 1.5 times the generating air supply flow rate in the "SR2" state. As described above, the proportion of generating air to be increased is varied by output electrical power and in this example, the incremented quantity increases when the output power is increased.

In this variation the proportions of fuel and generating air combusted in the combustion chamber are maintained in the same manner in the "SR2" state prior to electrical generation startup, when fuel and air are not used for electrical generation, and in the post-generation startup state, when fuel and air are used for electrical generation, therefore there is no change in the air-fuel ratio for combustion before and after electrical generation, and combustion in the combustion chamber can be stabilized.

Also, in this variation, the ratio of the fuel supply flow rate and the generating air supply flow rate in the "SR2" state, during which the electrical generation standby fuel supply flow rate is being maintained is changed in the manner described above, in response to the estimated required power, therefore the proportion of fuel and air combusted in the combustion chamber is not changed before and after electrical generation startup, even when the required power differs.

We have described above preferred embodiments of the invention, but various changes can also be applied to the above-described embodiments. In particular, in the above-described embodiment the reform reaction is induced in the reformer at the time of startup in the sequence POX, ATR, and SR, but the ATR could, for example, be omitted. The present invention can be applied to a solid oxide fuel cell device for executing any desired startup processing for inducing a SR immediately prior to electrical generation.

What is claimed is:

1. A solid oxide fuel cell system for reacting fuel with an oxidation gas to generate electrical power responsive to a required power, comprising:
a fuel cell module comprising multiple solid oxide fuel cell units;
a reformer that supplies reformed fuel to the solid oxide fuel cell units;
a fuel supply device that supplies the fuel to the reformer for reformation thereof;
a water supply device that supplies water to the reformer;
an oxidation gas supply device that supplies the oxidation gas to the solid oxide fuel cell units; and
a controller programmed to execute, before transitioning to an output operation for outputting the electrical power from the solid oxide fuel cell system, a startup operation in which the solid oxide fuel cell units of the fuel cell module are raised to a temperature at which electricity can be outputted from the solid oxide fuel cell system, the startup operation comprising consecutively performed first and second steam reforming operations in which the controller is programmed to control the fuel supply device and the water supply device to begin a steam reforming reaction, the first steam reforming operation being performed prior to the second steam reforming operation, which is performed immediately prior to the output operation,
wherein the controller is further programmed to determine, during the startup operation, a standby fuel supply rate according to power requirement monitored during the startup operation and control the fuel supply device to supply the fuel at the determined standby fuel supply rate during the second steam reforming operation, and further wherein the determined standby fuel supply rate is lower than a fuel supply rate effected during the first steam reforming operation.

2. The solid oxide fuel cell system of claim 1, further comprising a power requirement estimating circuit that estimates, during the startup operation, an amount of electrical power to be outputted at a beginning of the output operation, wherein the controller is programmed to determine the standby fuel supply rate based on the amount of electrical power to be outputted estimated by the power requirement estimating circuit.

3. The solid oxide fuel cell system of claim 2, wherein the fuel cell module is operable to output from the solid oxide fuel cell system the electrical power variable within a predetermined output power range, and the controller is programmed to determine the standby fuel supply rate such that the determined standby fuel supply rate is greater than a fuel supply rate for achieving a bottom output power of the predetermined output power range.

4. The solid oxide fuel cell system of claim 3, wherein the power requirement estimating circuit estimates the amount of electrical power to be outputted at the beginning of output operation based on the power requirement monitored during the startup operation through an end of the first steam reforming operation.

5. The solid oxide fuel cell system of claim 3, wherein the power requirement estimating circuit estimates the amount of electrical power to be outputted at the beginning of outputting the electrical power from the solid oxide fuel cell system based on an average of the power requirement monitored during the startup operation through the end of the first steam reforming operation.

6. The solid oxide fuel cell system of claim 2, wherein the controller is programmed to determine the standby fuel supply rate such that the determined standby fuel supply rate will achieve outputting of electrical power greater than the amount of electrical power to be outputted estimated by the power requirement estimating circuit.

7. The solid oxide fuel cell system of claim 1, wherein the controller is programmed to determine the standby fuel supply rate based on a time zone of day to which a point in time to activate the fuel cell module belongs.

8. The solid oxide fuel cell system of claim 1, wherein the controller is programmed to control the oxidation gas supply device, during the second steam reforming operation, to supply the oxidation gas at a rate necessary to enable outputting of an amount of electrical power achievable with the fuel supplied at the standby fuel supply rate.

9. The solid oxide fuel cell system of claim 3, wherein the controller is programmed to control the fuel supply device, the water supply device, and the oxidation gas supply device during the second steam reforming operation to attain a fuel supply rate, a water supply rate, and oxidation gas supply rate, respectively, proportions of which differ from proportions of fuel supply rate, water supply rate, and oxidation gas supply rate used at the beginning of output operation.

10. The solid oxide fuel cell system of claim 9, wherein the oxidation gas supply rate attains a proportion, during the second steam reforming operation, which is greater than a proportion of the oxidation gas supply rate used at the beginning of output operation.

* * * * *